United States Patent [19]

Hardy, Jr. et al.

[11] Patent Number: 5,155,354
[45] Date of Patent: Oct. 13, 1992

[54] TARGET DETECTOR CAPABLE OF REJECTING CLOSE-IN OBJECTS

[75] Inventors: Arthur H. Hardy, Jr.; James S. Lee; John E. Clement, all of Santa Barbara, Calif.

[73] Assignee: Santa Barbara Research Center, Goleta, Calif.

[21] Appl. No.: 652,966

[22] Filed: Feb. 8, 1991

[51] Int. Cl.$^5$ .............................................. G01S 7/48
[52] U.S. Cl. ................... 250/216; 250/203.2; 250/203.6; 250/353; 356/141; 356/152
[58] Field of Search ............ 250/353, 216, 203.1, 250/203.2, 203.6, 203.4, 222.1; 356/141, 152

[56] References Cited

U.S. PATENT DOCUMENTS

| | | | |
|---|---|---|---|
| 4,325,633 | 4/1982 | Gardner | 356/141 |
| 4,385,833 | 5/1983 | Gardner | 356/141 |
| 4,479,053 | 10/1984 | Johnston | 250/221 |
| 4,788,439 | 11/1988 | Hardy et al. | 250/561 |
| 4,855,588 | 8/1989 | Holmes | 250/203 R |

Primary Examiner—Constantine Hannaher
Attorney, Agent, or Firm—W. C. Schubert; W. K. Denson-Low

[57] ABSTRACT

Object detection apparatus (40) inlcudes a transmitter assembly (44) and a receiver assembly (10). The receiver assembly includes a receiver element (12) having an input aperture (16) for receiving electromagnetic radiation reflecting from an object. The receiver element further includes an output aperture (24) and a curved surface (22) disposed relative to the input aperture for reflecting substantially all electromagnetic radiation (A,B,C) reflecting from an object at a range in excess of a range of interest, to the output aperture. A first radiation detector (14) is disposed at the output aperture for receiving the object radiation reflected thereto and for generating a first electrical signal. A second radiation detector (30) is disposed at a location upon the receiver assembly for receiving object radiation reflected thereto that reflects from an object at a range that is within the range of interest. The apparatus further includes circuitry (32, 34, 35, 36, 37, 38, 39) for combining the first electrical signal with the second electrical signal for substantially eliminating a component of the first electrical signal that is due to electromagnetic radiation reflecting from an object within the range of interest.

21 Claims, 4 Drawing Sheets

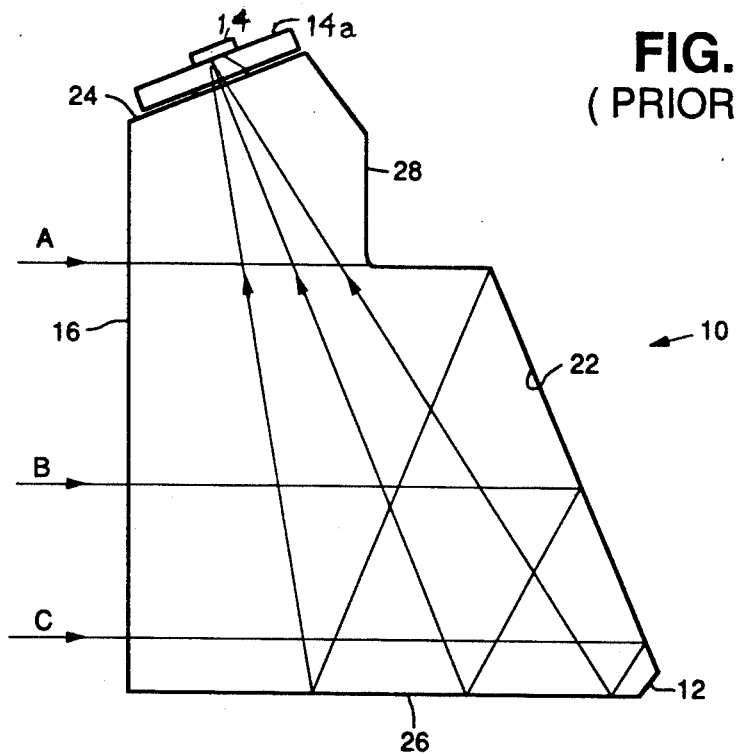
FIG. 1a.
(PRIOR ART)
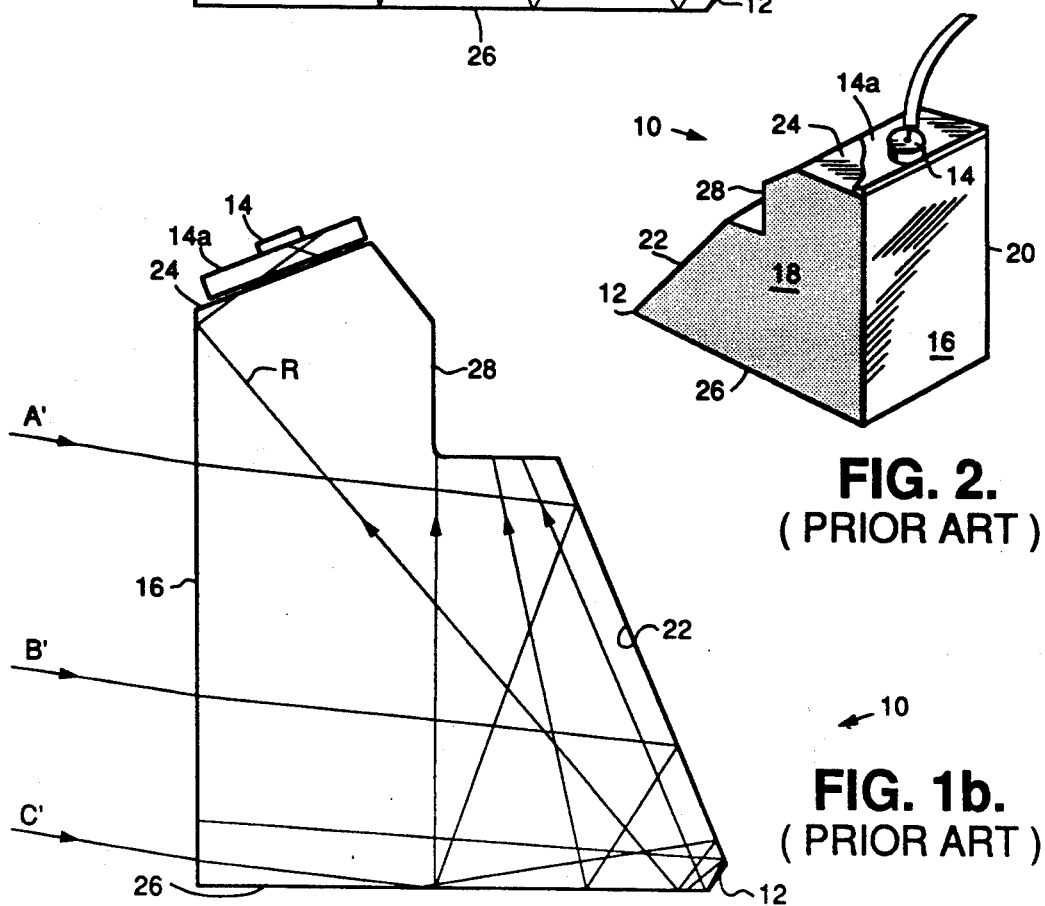
FIG. 2.
(PRIOR ART)
FIG. 1b.
(PRIOR ART)

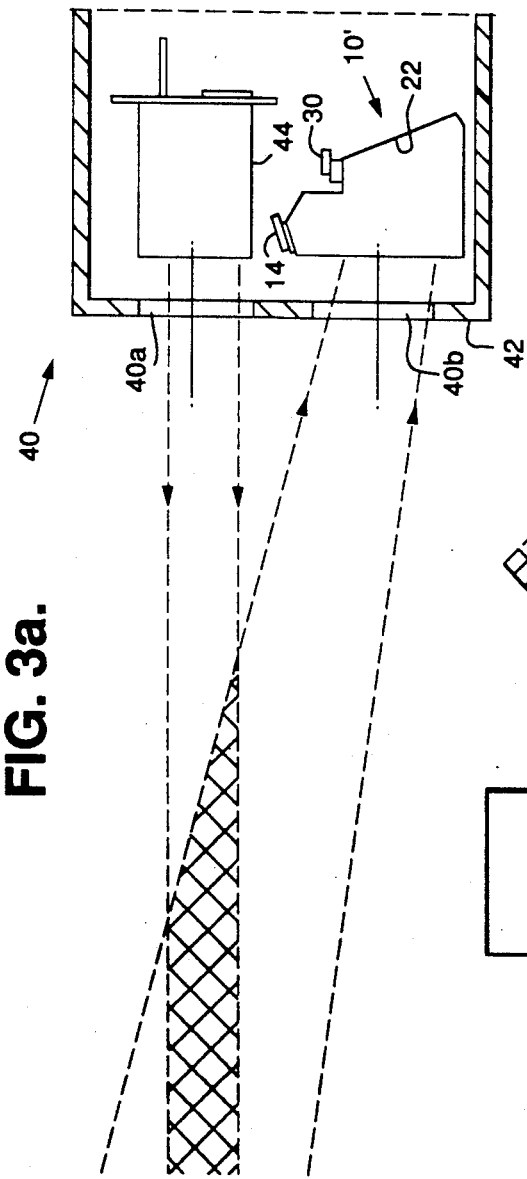
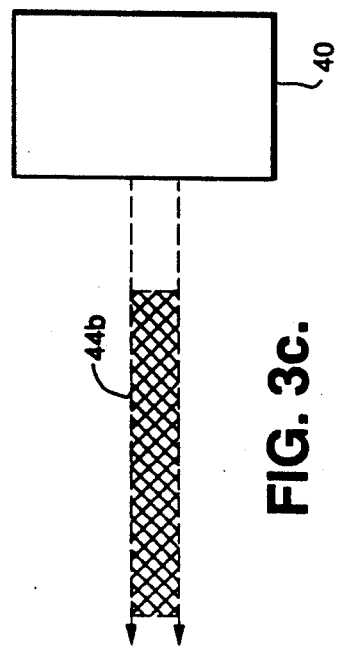
FIG. 3a.
FIG. 3b.
FIG. 3c.

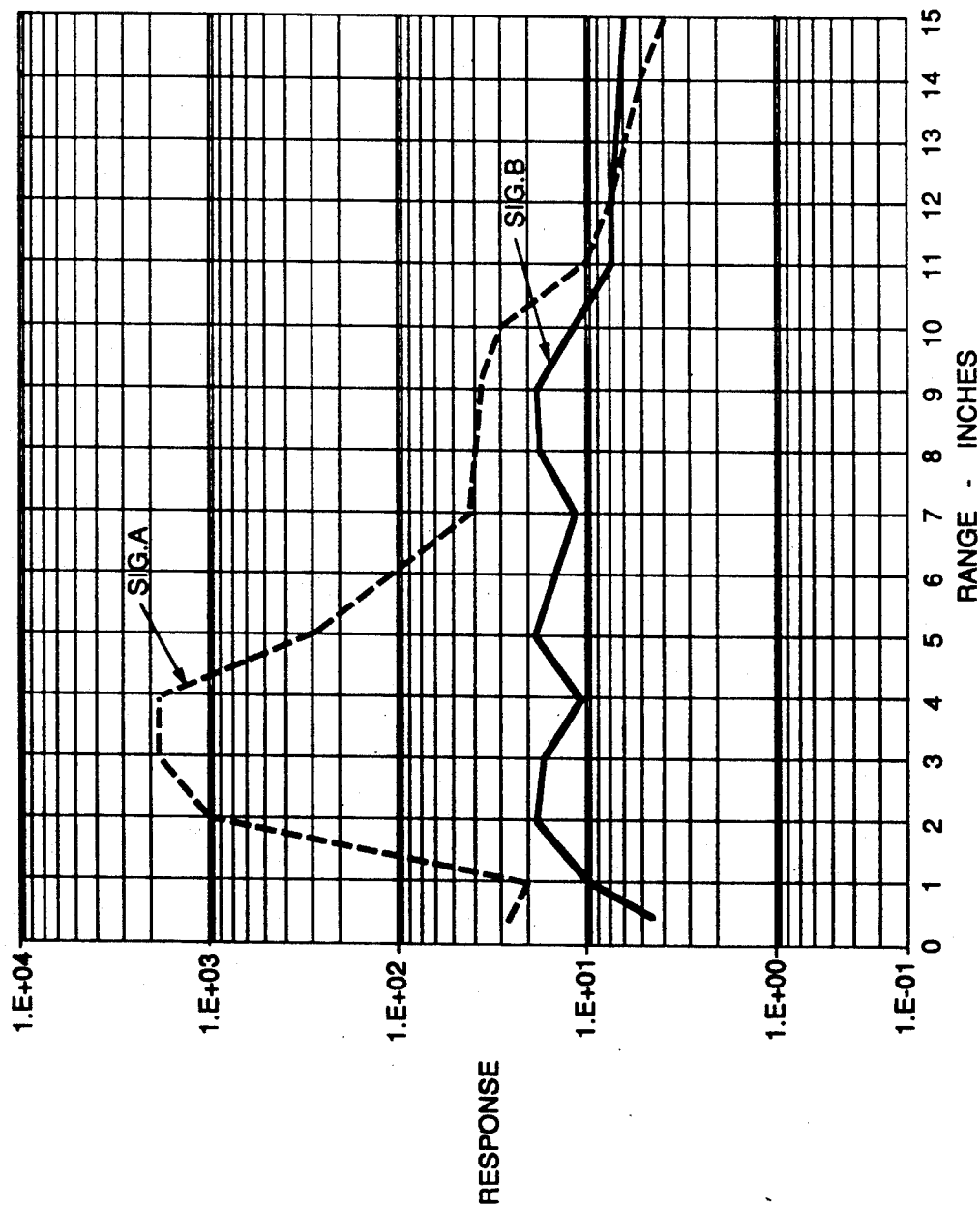

TARGET DETECTOR CAPABLE OF REJECTING CLOSE-IN OBJECTS

FIELD OF THE INVENTION

This invention relates generally to target detection electro-optic apparatus and, in particular, to an improved target detector having a receiver element that includes an auxiliary photodetector for reducing an excessive sensitivity to a target located within a predetermined range of concern.

BACKGROUND OF THE INVENTION

In commonly assigned U.S. Pat. No. 4,788,439, issued Nov. 29, 1988, entitled "Multiple Detector Fog Suppression and Edge Enhancement" A. H. Hardy et al. describe a proximity sensing system that detects target objects while protecting against false target detection due to fog, clouds, or other aerosols. One or more target detectors are alternately disposed adjacent to one or more guard detectors in such a manner that the edges of fields of view are immediately adjacent. Positive signals generated from target detectors are summed with negative signals from the guard detectors. The summing action steepens the slope of the summed signal that is produced when a target image moves onto the edge of a target detector.

In U.S. Pat. No 4,479,053, issued Oct. 23, 1984, entitled "Focal Plane Array Optical Proximity Sensor" A. R. Johnson discloses an optical proximity sensor that includes an illuminator assembly and a detector assembly. Lenses associated with each assembly are spaced apart in order to define a predetermined detection volume.

One problem associated with some target detection systems of the prior art is that an excessive sensitivity is experienced for objects located within a predetermined distance range. This excessive sensitivity results from optical side lobes and multiple reflections.

It is therefore an object of the invention to provide for a substantial elimination of excessive response within a predetermined range of a receiver element associated with a target detector system.

SUMMARY OF THE INVENTION

The foregoing and other problems are overcome and the object of the invention is realized by a target detector having a reduced or eliminated sensitivity to a target within a predetermined range of interest. The target detector includes a transmitter assembly and a receiver assembly. The receiver assembly includes a first photodetector positioned upon a receiver element. The receiver assembly receives light rays reflecting from a target viewed by the receiver assembly. A second photodetector is located upon the receiver assembly at a position where light rays reflecting from a target, within the predetermined range of interest, fall on the second photodetector. An electrical signal generated by the second photodetector is combined with an electrical signal generated by the first photodetector. A gain of the second signal is established such that the combined signal is maintained at an acceptable level over the range of interest.

In accordance with the invention there is disclosed object detection apparatus that includes a transmitter assembly and a receiver assembly. The receiver assembly includes a receiver element having an input aperture for receiving electromagnetic radiation reflecting from an object. The receiver element further includes an output aperture and a curved surface disposed relative to the input aperture for reflecting substantially all electromagnetic radiation, reflecting from an object at a range in excess of a range of interest, to the output aperture. A first radiation detector is disposed at the output aperture for receiving the object radiation reflected thereto and for generating a first electrical signal having a magnitude that is a function of a magnitude of the electromagnetic radiation received by the first radiation detector. A second radiation detector is disposed at a location upon the receiver assembly for receiving object radiation reflected thereto that reflects from an object located at a range that is within the range of interest. The second radiation detector generates a second electrical signal with a magnitude that is a function of a magnitude of the electromagnetic radiation received by the second radiation detector. The apparatus further includes circuitry for combining the first electrical signal with the second electrical signal for substantially eliminating a component of the first electrical signal that is due to electromagnetic radiation reflecting from an object within the range of interest.

BRIEF DESCRIPTION OF THE DRAWING

The above set forth and other features of the invention are made more apparent in the ensuing Detailed Description of the Invention when read in conjunction with the attached Drawing, wherein:

FIG. 1a is cross-sectional view of a target detector receiver assembly of the prior art, the view showing light rays reflecting from a target at a range outside of a range of interest and a single photodetector disposed for detecting these rays;

FIG. 1b is cross-sectional view of the target detector receiver assembly of FIG. 1a, the view showing light rays reflecting from a target at a range within the range of interest;

FIG. 2 is an elevational view showing the prior art target detector receiver assembly of FIGS. 1a and 1b;

FIG. 3a illustrates a target detector constructed and operated in accordance with the invention and including a transmitter assembly and a receiver assembly;

FIG. 3b is a top view of the target detector of FIG. 3a illustrating a transmitted fan beam radiation pattern;

FIG. 3c is a top view of the target detector of FIG. 3a illustrating a transmitted pencil beam radiation pattern;

FIG. 4 is a graph that depicts the improvement in in-range response that is achieved through the use of the invention.

DETAILED DESCRIPTION OF THE INVENTION

Figure 3D:
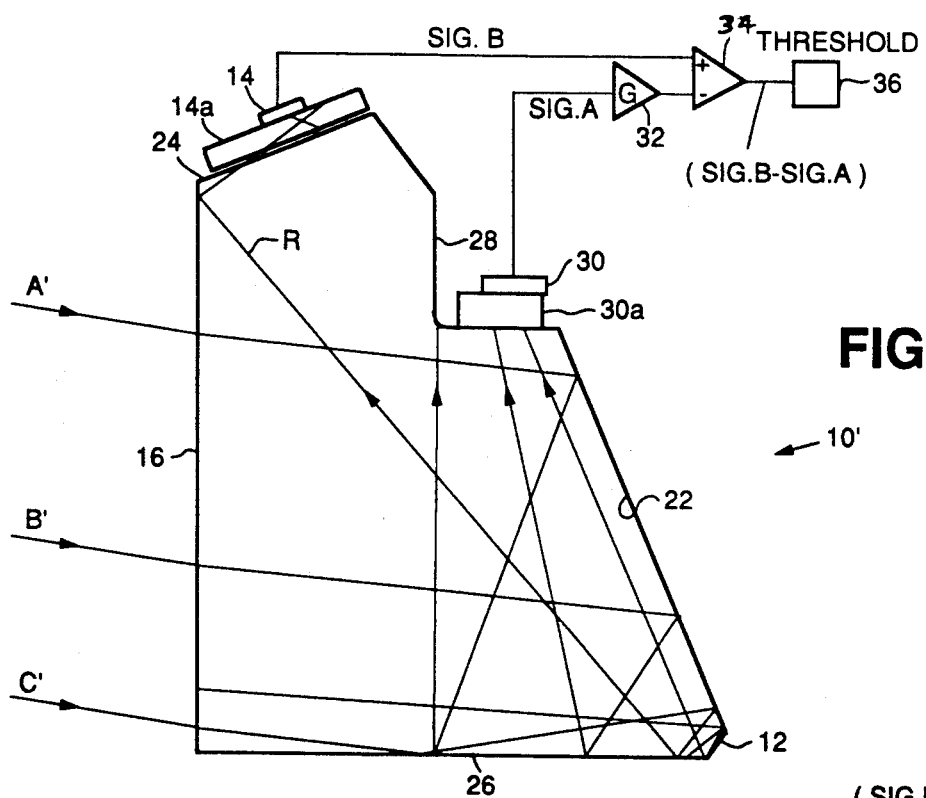
FIG. 3d is cross-sectional view of the receiver assembly associated with the target detector of the invention, the view showing light rays reflecting from a target located at a range within the range of interest and the interception thereof by a second photodetector.

FIGS. 1a, 1b, and 2 depict a portion of a prior art target detector receiver assembly 10. Receiver assembly 10 includes a receiver element 12 and a photodetector 14, both of which are disposed for receiving light rays reflecting a target (not shown). A filter 14a is interposed between the detector 14 and the receiver element 12. Also not shown in FIGS. 1a, 1b and 2 is a transmitter assembly that projects a beam of light for illuminating objects in front of the receiver assembly 10. The reflected light rays are focussed and directed to the photodetector 14 by reflective surfaces associated with the receiver assembly 10.

The shape of receiver element 12, in a presently preferred embodiment of the invention, is similar to that disclosed in FIGS. 7 and 8 of commonly assigned U.S. Pat. No. 4,325,633, issued Apr. 20, 1982, entitled "Apparatus for Determining of Angle of Incidence of Electromagnetic Radiation" by r Leland V. Gardener. The disclosure U.S. Pat. No. 4,325,633 is incorporated herein by reference in its entirety. As employed therein a receiver 10' is used in an angle of arrival detection system and incorporates a plurality of photodiodes.

In FIG. 1a, 1b and 2 the receiver element 12 is comprised of a single block of glass. The receiver element 12 has a planar transparent front surface, this surface functioning as an input aperture 16. Planar surfaces 18 and 20 delimit the sides of the receiver element 12. These surfaces are clad and blackened and define therebetween a portion of a chamber. The receiver element 12 has an elliptical cylinder reflector 22 functioning as a rear chamber surface. The elliptical curvature of the reflector 22 is described by the equation:

$$X^2/A^2 + Y^2/B^2 = 1$$

where
X = coordinate on X axis,
Y = coordinate on Y axis,
A = major semi-axis, and
B = minor semi-axis.

In the case where A is very large relative to B, the ellipse approximates a parabola so closely that the difference is not significant.

A planar transparent surface 24 provides an output aperture. A further planar surface 26 is made reflective and serves to fold the optical path such that rays that are reflected from surface 22 are reflected from surface 26 to the output aperture 24. The curvature of the reflector 22 is chosen such that input rays (A, B, C) reflecting from a target outside of a range of interest are focussed at the output aperture 24.

As is also shown in the perspective view of FIG. 2 the photodetector 14 is mounted at the output aperture 24 to detect the focussed target image and, hence, the presence of the target. The photodetector 14 is preferably a silicon PIN-type device.

In the angle of arrival receiver 10 disclosed in the above referenced U.S. Pat. No. 4,325,633 a slot is cut across the rear surface. The slot is provided to block rays resulting from undesirable reflections due to targets at angles outside the range of the detector. This is said to be important in minimizing detection of the sun or sunlit clouds in the vicinity of the detector surface.

FIG. 1b illustrates the operation of the receiver assembly 10 for a target that enters the range of interest. For this embodiment the target range of interest is considered to be within a range of zero inches to approximately 12 inches from the surface of the input aperture 16. As can be seen, beams A', B' and C' are incident upon the input aperture 16 at an angle such that the focussed beam is no longer primarily incident on the detector 14. As the target approaches the input aperture 16 the angle between the rays (A', B, and C,) and the surface of the input aperture 16 decreases, resulting in an increase in an elevation angle referenced to a line normal to the input aperture 16 surface. As the elevation angle increases, the focussed rays move off of the output aperture 24 in a direction away from the input aperture 16 and towards a slot 28. By example, for a target range of less than approximately 12 inches a significant portion of the reflected rays can be seen to be incident upon the slot 28, as shown in FIG. 1b. This is a desired result in that a substantial rejection of close-in targets is achieved.

However, it has been found that there is a sufficient amount of scattering both within and outside of the receiver assembly 10 such that when the target is close in, and when a magnitude of the returned signal is high, a significant optical signal is still received by the photodetector 14. This optical signal incident on the photodetector 14 produces an unwanted in-range response. This problem is due primarily to optical side lobes and multiple reflections, as indicated by the ray (R).

In order to eliminate this problem of undesirable in-range response, and in accordance with the embodiment of the invention depicted in FIGS. 3a-3d, a second photodetector 30 is positioned on the receiver assembly 10 at a location such that the signal from the photodetector 30 is operable to reduce the undesirable in-range response of the photodetector 14. The use of the second photodetector 30 may also be employed to generate a true in-range "hole", that is, a range in which a diffuse target cannot be sensed regardless of how bright the diffuse target appears. Preferably, the photodetector 30 is also a silicon PIN-type device having spectral response characteristics that are similar or identical to those of the photodetector 14. A filter 30a may be interposed between photodetector 30 and the receiver element 12.

Referring to FIG. 3a there is illustrated a target detector system 40 constructed and operated in accordance with the invention. A housing 42 having transparent windows 40a and 40b encloses a transmitter assembly 44 and a receiver assembly 10'. As can be seen in the top views of FIG. 3b and FIG. 3c the transmitter assembly 44 transmits through the window 40a a fan-shaped beam 44a or a pencil-shaped beam 44b. The transmitted beam is preferably a pulsed beam of radiation having wavelengths within the infrared spectrum. It should be realized, however, that the teaching of the invention also applies to a radiation source having a continuous wave modulation. The transmitted beam reflects from an object or target disposed in front of the system 40. The reflected beam enters the system 40 through the window 40b and impinges on the input aperture of the receiver assembly 10'.

For the embodiment shown in FIG. 3a and FIG. 3d the second photodetector 30 is positioned at the slot 28. That is, the second photodetector 30 is positioned at a region of the receiver assembly 10' where rays are directed that reflect from a target within the range of interest. Photodetector 30 thus receives a strong optical return from the direct rays only when the target is close to the input aperture 16, that is, within the range of interest.

In the embodiment depicted in FIG. 3d the output signal from the second photodetector 30 is applied to a gain block 32 and thence to an inverting input of an amplifier 34. The amplifier 34 operates to subtract the signal generated by the photodetector 30 from the signal generated by the photodetector 14, thereby effectively eliminating the component of target radiation (R) that is received by the photodetector 14 due to internal reflection and scattering within the receiver assembly 10'. The gain block 32 is selected to provide an amount of gain to the output signal of the photodetector 30 such that, for example, a threshold comparator block 36 does not generate a target detected signal when the target is within the range of interest. For a given application the gain of block 32 may be greater than or less than unity.

FIG. 4 depicts the output of the photodetector 14 (solid trace B) and the output of the second photodetector 30 (dashed trace A) as a function of target range from the input aperture 16. Subtracting the signal A from the signal B substantially eliminates any response due to a target within the range of interest, or 12 inches or less for this embodiment.

It should be realized that a number of modifications may be made to the teaching of the invention while still accomplishing the desired result. For example, the shape of the receiver assembly 10' may be other than that depicted in FIG. 3a and FIG. 3d. Also, the signal from the photodetector 30 may be combined in a manner other than subtracting the signal from the output of photodetector 14. For example, the electrical signal from photodetector 30 may be employed to vary the gain of the amplifier 34 such that the signal from photodetector 14 is attenuated for close-in targets.

Figure 5:
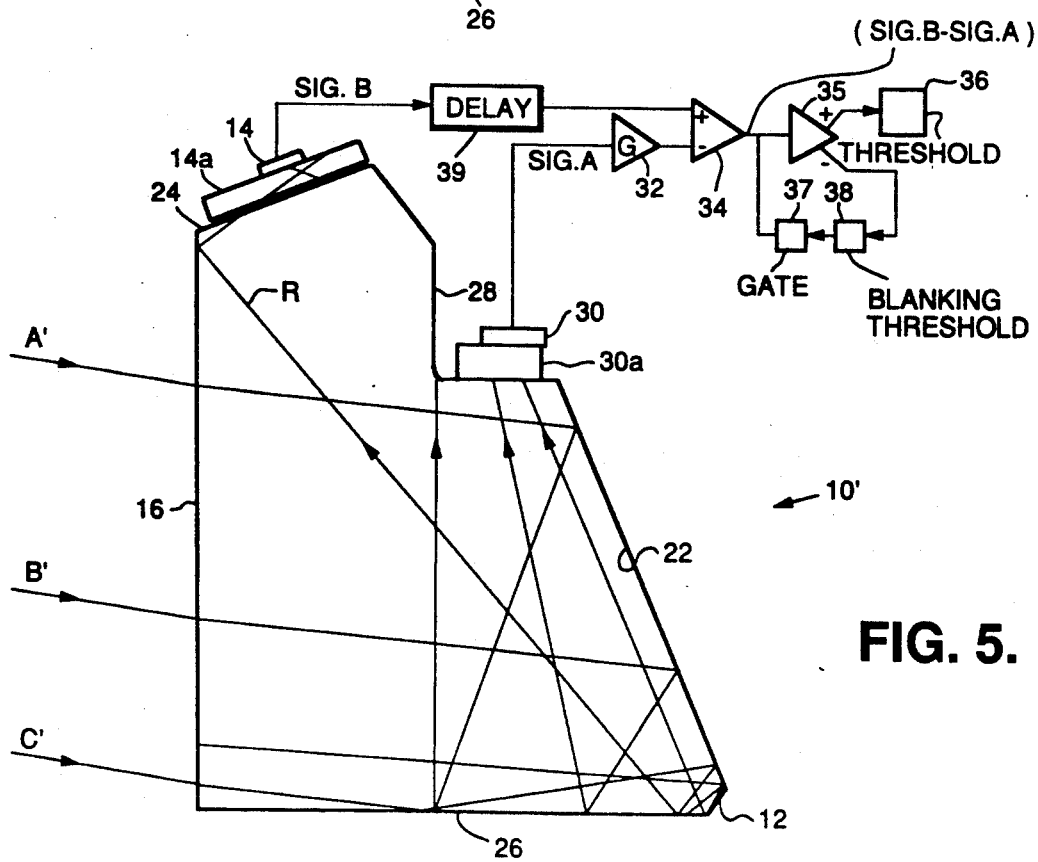
FIG. 5 is cross-sectional view of the receiver assembly associated with the target detector of the invention, the Figure showing a further embodiment of signal combining circuitry.

In this regard, and referring to FIG. 5, there is shown another embodiment of the signal processing electronics for combining the outputs of the photodetectors 14 and 30. In FIG. 5 the output of the signal combining amplifier 34 drives a further amplifier 35, a noninverting (+) output of which drives the threshold circuit 36. An inverting (−) output of the amplifier 35 drives the input of a blanking threshold circuit 37 which detects a positive voltage excursion due to a signal from the detector 30. A large signal from the detector 30 will be differentiated by the electronic circuitry and may cause a false target detection at threshold 36. The output of the blanking threshold circuit 37 drives a blanking gate 38 which operates to shut-off the amplifier 35 by diverting to ground, for a predetermined interval of time, the signal from amplifier 34. This arrangement prevents a false target detection due to differentiation of a large signal from detector 30. To further enhance performance, and to partially compensate for signal delay caused by gain block 32, the signal from detector 14 may be delayed by a predetermined amount from the signal generated by detector 30. This is accomplished by delay element 39.

Thus, while the invention has been particularly shown and described with respect to embodiments thereof, it will be understood by those skilled in the art that changes in form and details may be made therein without departing from the scope and spirit of the invention.

What is claimed is:

1. Object detection apparatus including a transmitter of electromagnetic radiation, the apparatus comprising:
    receiver means having an input aperture for receiving electromagnetic radiation reflecting from an object, said receiver means further including an output aperture, said receiver means including a curved surface disposed relative to said input aperture for reflecting substantially all electromagnetic radiation, reflecting from an object at a range in excess of a range of interest, to a focussed image of said object at said output aperture;
    first radiation detector means, disposed at said output aperture, for receiving the object radiation reflected thereto and for generating a first electrical signal having a magnitude that is a function of a magnitude of the electromagnetic radiation received by said first radiation detector means;
    second radiation detector means disposed at a location upon said receiver means for receiving object radiation reflected thereto that reflects from an object at a range that is within the range of interest, said second radiation detector means and said curved surface being located so that said second radiation detector receives radiation reflected from said curved surface before it forms a focussed target image, said second radiation detector means generating a second electrical signal having a magnitude that is a function of a magnitude of the electromagnetic radiation received by said second radiation detector means; and
    means for combining said first electrical signal with said second electrical signal for substantially eliminating any component of said first electrical signal that is due to electromagnetic radiation reflecting from an object within the range of interest.

2. Object detection apparatus as set forth in claim 1 wherein said first and said second radiation detector means are each comprised of a silicon photodetector.

3. Object detection apparatus as set forth in claim 1 wherein said receiver means is comprised of glass.

4. Object detection apparatus as set forth in claim 1 wherein combining means includes means for subtracting said second electrical signal from said first electrical signal.

5. Object detection apparatus as set forth in claim 4 and further comprising means, interposed between said second radiation detector means and said combining means, for applying a predetermined gain to said second electrical signal.

6. Object detection apparatus as set forth in claim 4 and further comprising means, coupled to an output of said combining means, for detecting a condition wherein an object is within the range of interest and for preventing an occurrence of a target detected signal.

7. Object detection apparatus as set forth in claim 4 and further comprising means, interposed between said first radiation detector means and said combining means, for applying a predetermined delay to said first electrical signal.

8. A receiver for providing an electrical signal corresponding to electromagnetic energy reflecting from an object viewed by the receiver, comprising:
    a first surface defining an input aperture;
    second and third surfaces extending from said first surface so as to partially define a chamber therebetween, said second and third surfaces providing interior side walls for said chamber;
    a fourth surface extending substantially normally from said first, second and third surfaces for defining a floor of said chamber;
    a fifth surface joining said second, third, and fourth surfaces to define a rear wall of said chamber, said fifth surface having a reflective side and being curved such that electromagnetic energy which passes through said input aperture is reflected and focused by said fifth surface, said reflected and focussed radiation being incident upon said fourth planar surface and reflecting therefrom.

a sixth surface joining said first surface and said fifth surface and being disposed for receiving said radiation reflected from said fourth surface, said sixth surface being transparent and defining an output aperture; said fifth surface including a slot which extends transversely thereacross from said second surface to said third surface between said fourth and sixth surfaces;

first detector means disposed at said sixth surface for developing a first electrical signal corresponding to electromagnetic energy incident thereon;

second detector means disposed at said slot for developing a second electrical signal corresponding to electromagnetic energy incident thereof; and means for combining said first electrical signal and said second electrical signal to derive a third electrical signal, said third electrical signal having a magnitude below a predetermined magnitude when the object is within a predetermined distance from said input aperture.

9. A receiver as set forth in claim 8 wherein the predetermined distance is approximately 12 inches.

10. A receiver as set forth in claim 8 wherein combining means includes means for subtracting said second electrical signal from said first electrical signal.

11. A receiver as set forth in claim 10 and further comprising means, interposed between said second detector means and said combining means, for applying a predetermined gain to said second electrical signal.

12. A receiver as set forth in claim 8 and further comprising means, coupled to an output of said combining means, for detecting a condition wherein an object is within the range of interest when the object is within the predetermined distance and for preventing an occurrence of an object detected condition.

13. A receiver as set forth in claim 8 and further comprising means, interposed between said first detector means and said combining means, for applying a predetermined delay to said first electrical signal.

14. In a target detector of the type having a transmitter of electromagnetic radiation and a receiver, the receiver including an input aperture, a curved reflecting surface, an output aperture, and a first radiation detector located at said output aperture for developing a first electrical signal corresponding to electromagnetic radiation incident thereon, the curved reflecting surface disposed so that electromagnetic radiation from said transmitter reflecting from an object outside a predetermined distance form said input aperture and entering said receiver through said input aperture is reflected by said curved reflecting surface to a focused target image arriving at said first radiation detector, said receiver also including means, located between said curved reflecting surface and said output aperture, for physically blocking from substantially arriving at said first radiation detector electromagnetic radiation from said transmitter that is reflected form an object within said predetermined distance, thereafter enters said receiver through said input aperture and is subsequently reflected by said curved reflecting surface, the improvement comprising:

a second radiation detector located at said means for blocking for developing a second electrical signal corresponding to electromagnetic incident thereof; and means for combining said first electrical signal and said second electrical signal to derive a third electrical signal, said third electrical signal having a magnitude below a predetermined magnitude when the object is within said predetermined distance form said input aperture.

15. The target detector of claim 14 further comprising an intermediate reflecting surface for intercepting electromagnetic radiation entering said input aperture and reflected by said curved reflecting surface and for directing said electromagnetic radiation toward said output aperture and said means for blocking.

16. The improved target detector of claim 15 wherein the predetermined distance is approximately 12 inches.

17. The target detector of claim 15 wherein said curved reflecting surface and said intermediate reflecting surface comprise adjacent sides of a block of material that is optically transparent to electromagnetic radiation and wherein said means for flocking comprises a slot adjacent to said curved reflecting surface and opposite said intermediate reflecting surface.

18. A target detector as set forth in claim 14 wherein the combining means includes means for subtracting said second electrical signal from said first electrical signal.

19. A target detector as set forth in claim 18 and further comprising means, interposed between said second radiation detector and said combining means for applying a predetermined gain to said second electrical signal.

20. A target detector as set forth in claim 14 further comprising means, coupled to an output of said combining means, for detecting a condition wherein an object is within the predetermined distance and for preventing an occurrence of an object detected condition in such a situation.

21. A target detector as set forth in claim 14 further comprising means interposed between said first detector and said combining means, for applying a predetermined delay to said first electrical signal.

* * * * *